(12) United States Patent
Yang

(10) Patent No.: US 11,125,992 B2
(45) Date of Patent: Sep. 21, 2021

(54) CHROMATIC ABERRATION ADJUSTING METHOD AND APPARATUS OF DETECTION DEVICE

(71) Applicants: HKC Corporation Limited, Shenzhen (CN); Chongqing HKC Optoelectronics Technology Co., Ltd., Chongqing (CN)

(72) Inventor: Yongfei Yang, Chongqing (CN)

(73) Assignees: HKC Corporation Limited, Shenzhen (CN); Chongqing HKC Optoelectronics Co., Ltd., Chongqing (CN)

( * ) Notice: Subject to any disclaimer, the term of this patent is extended or adjusted under 35 U.S.C. 154(b) by 15 days.

(21) Appl. No.: 16/628,604

(22) PCT Filed: Jul. 5, 2018

(86) PCT No.: PCT/CN2018/094678
§ 371 (c)(1),
(2) Date: Jan. 3, 2020

(87) PCT Pub. No.: WO2019/007401
PCT Pub. Date: Jan. 10, 2019

(65) Prior Publication Data
US 2020/0319453 A1    Oct. 8, 2020

(30) Foreign Application Priority Data
Jul. 6, 2017 (CN) .......................... 201710550386.7

(51) Int. Cl.
*G02B 27/00* (2006.01)
*H04N 5/357* (2011.01)
*H04N 9/04* (2006.01)

(52) U.S. Cl.
CPC ....... *G02B 27/0025* (2013.01); *H04N 5/3572* (2013.01); *H04N 9/04517* (2018.08)

(58) Field of Classification Search
CPC .......... G02B 27/0025; H04N 9/04517; H04N 5/3572; H04N 5/3651; H04N 17/00
See application file for complete search history.

(56) References Cited

U.S. PATENT DOCUMENTS 9,743,057 B2 * 8/2017 Cote ................ H04N 5/232933
2010/0002071 A1 * 1/2010 Ahiska ............... H04N 5/23238
348/36

(Continued)

FOREIGN PATENT DOCUMENTS

| CN | 103278903 A | 9/2013 |
| CN | 104394325 A | 3/2015 |
| CN | 107197240 A | 9/2017 |

*Primary Examiner* — Hung H Lam
(74) *Attorney, Agent, or Firm* — Wang Law Firm, Inc.

(57) ABSTRACT

The present disclosure illustrates a chromatic aberration adjusting method and apparatus of a detection device. The method includes the following steps: recording optical parameters corresponding to multiple image detection components when the multiple image detection components are respectively used to obtain images of multiple different standard films, selecting one of the optical parameters for each standard film, enter the selected optical parameter into a database as a base, and adjust the optical parameters of other image sensing components according to the database. The apparatus comprises a recording module, a selection module, an input module and an adjustment module.

19 Claims, 13 Drawing Sheets

(56) References Cited

U.S. PATENT DOCUMENTS

| | | | |
|---|---|---|---|
| 2011/0074984 A1* | 3/2011 | Terasawa | H04N 5/3572 |
| | | | 348/241 |
| 2011/0235023 A1* | 9/2011 | Chen | G01M 11/31 |
| | | | 356/73.1 |
| 2017/0336611 A1* | 11/2017 | Kubo | G02B 21/06 |
| 2018/0302567 A1* | 10/2018 | Watanabe | G06T 5/006 |

* cited by examiner

CHROMATIC ABERRATION ADJUSTING METHOD AND APPARATUS OF DETECTION DEVICE

CROSS-REFERENCE TO RELATED APPLICATION

This application claims priority to China Patent Application No. 201710550386.7 filed on Jul. 6, 2017, and entitled "Chromatic aberration adjustment method and apparatus of detection device" at State Intellectual Property Office of the P.R.C, the entirety of which is hereby incorporated by reference.

BACKGROUND

1. Field

The present disclosure relates to an image processing technology field, more particularly to a chromatic aberration adjusting method and apparatus of a detection device.

2. Description of the Related Art

The above information disclosed in this Background section is for providing the background of the present disclosure and therefore it may contain information that may not form a prior art that is known to a person of ordinary skill in the art.

There are several reasons for occurrence of chromatic aberration between different image sensors, such as charge coupled device (CCD). For example, difference CCD manufacturing processes may cause inconsistency between CCD devices of CCD cameras, so that the different image sensors generate different electric signals upon receipt of the same optical signal. Other reasons include the difference in optical camera lens structures and corresponding circuits, the difference in optical environment where the camera lens capture image, and the different software parameters of the CCD imaging systems.

In order to solve above-mentioned problems, the conventional solution is to use software parameter adjusting manner in which different CCDs capture the same optical signal under a given optical environment and one of the CCDs is selected as an optical-electric signal reference, and the other CCDs are corrected according to the electric signal of the selected CCD. Generally, in adjusting process, each of the different CCDs captures an image of a white card or a black card for chromatic aberration adjusting. However, after the conventional adjustment, when the corrected CCD photographs a place greatly different from the reference environment, the great chromatic aberration also occurs. Therefore, what is need is to provide a chromatic aberration adjusting method to solve above-mentioned defects.

SUMMARY

The present disclosure provides a chromatic aberration adjusting method, and the method includes steps: recording optical parameters of a plurality of image sensors, wherein the plurality of image sensors are configured to capture images of a plurality of different standard sheets respectively by using the optical parameters; selecting an optical parameter for each of the different standard sheet; inputting the selected optical parameters into a database; and using the optical parameters stored in the database as a reference, to correct the optical parameters of other image sensors.

The present disclosure provides an apparatus of detection device. The apparatus of detection device includes a recording module, a selection module, an input module, and an adjusting module. The recording module is configured to record the optical parameters of a plurality of image sensors, and the plurality of image sensors are configured to capture images of a plurality of different standard sheets respectively by using the optical parameters. The selection module is configured to select an optical parameter for each of the different standard sheets. The input module is configured to input the selected optical parameter into a database. The adjusting module configured to use the optical parameters stored in the database as a reference to correct the optical parameters of other image sensors.

The present disclosure further provides an apparatus of detection device. The apparatus of detection device includes: a recording module comprising a first recording unit, a second recording unit and a third recording unit, and the first recording unit configured to record optical parameters of a plurality of image sensors wherein the plurality of image sensors are configured to capture images of the first standard sheet before the first process respectively by using the optical parameters, the second recording unit configured to record optical parameters of the plurality of image sensors wherein the plurality of image sensors are configured to capture images of a second standard sheet after the second process by using the optical parameters, and the third recording unit configured to record optical parameters of the plurality of image sensors wherein the plurality of image sensors are configured to capture images of a third standard sheet after the third process by using the optical parameters; a selection module configured to select an optical parameter for each of the first, second and third standard sheets; an input module comprising an optimization unit and an input unit, and the optimization unit configured to optimally rectify the selected optical parameters, and the input unit configured to input the optimized optical parameter into the database, and a adjusting module configured to use the optical parameters stored in the database as a reference, to correct the optical parameters of other image sensors.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
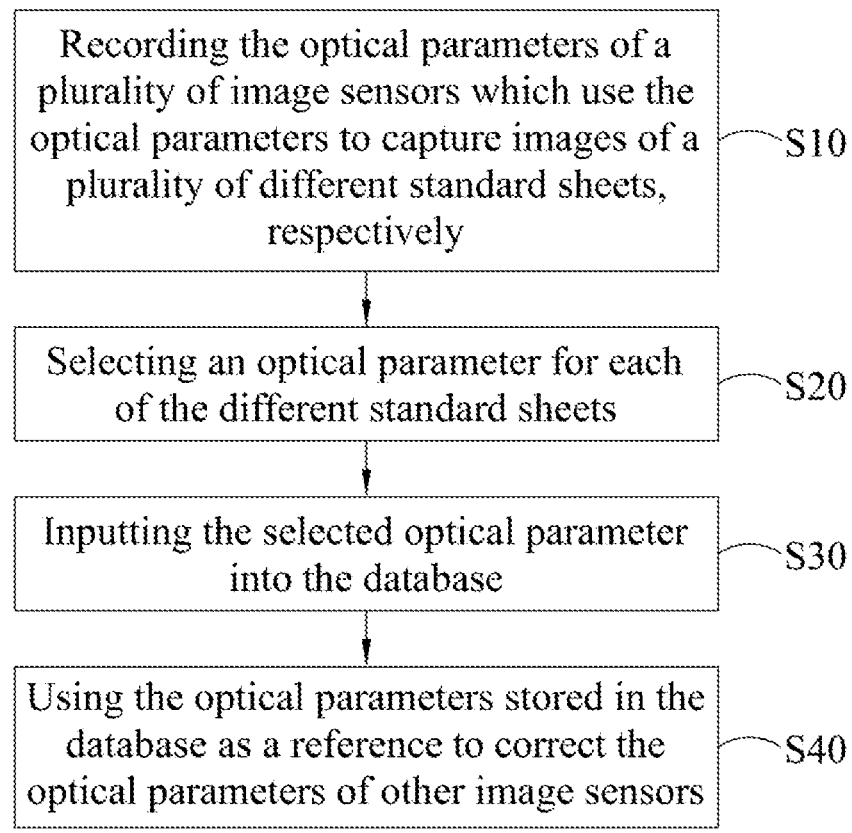
FIG. 1 is a flow chart of an embodiment of a chromatic aberration adjusting of the present disclosure.

The following embodiments of the present disclosure are herein described in detail with reference to the accompanying drawings. These drawings show specific examples of the embodiments of the present disclosure. It is to be understood that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

In order to solve the problem that the conventional technology is unable to effectively eliminate chromatic aberration, the present disclosure is to provide a chromatic aberration adjusting method.

An objective of the present disclosure is to provide a chromatic aberration correction method, so as to solve the problem that convention solution is unable to eliminate chromatic aberration effectively.

Please refer to FIG. 1. In an embodiment, the chromatic aberration adjusting method includes following steps S10 through S40.

Step S10: recording optical parameters of a plurality of image sensors, wherein the plurality of image sensors are configured to capture images of a plurality of different standard sheets, respectively by using the optical parameter. Preferably, the image sensor can be a CCD camera lens.

Figure 2:
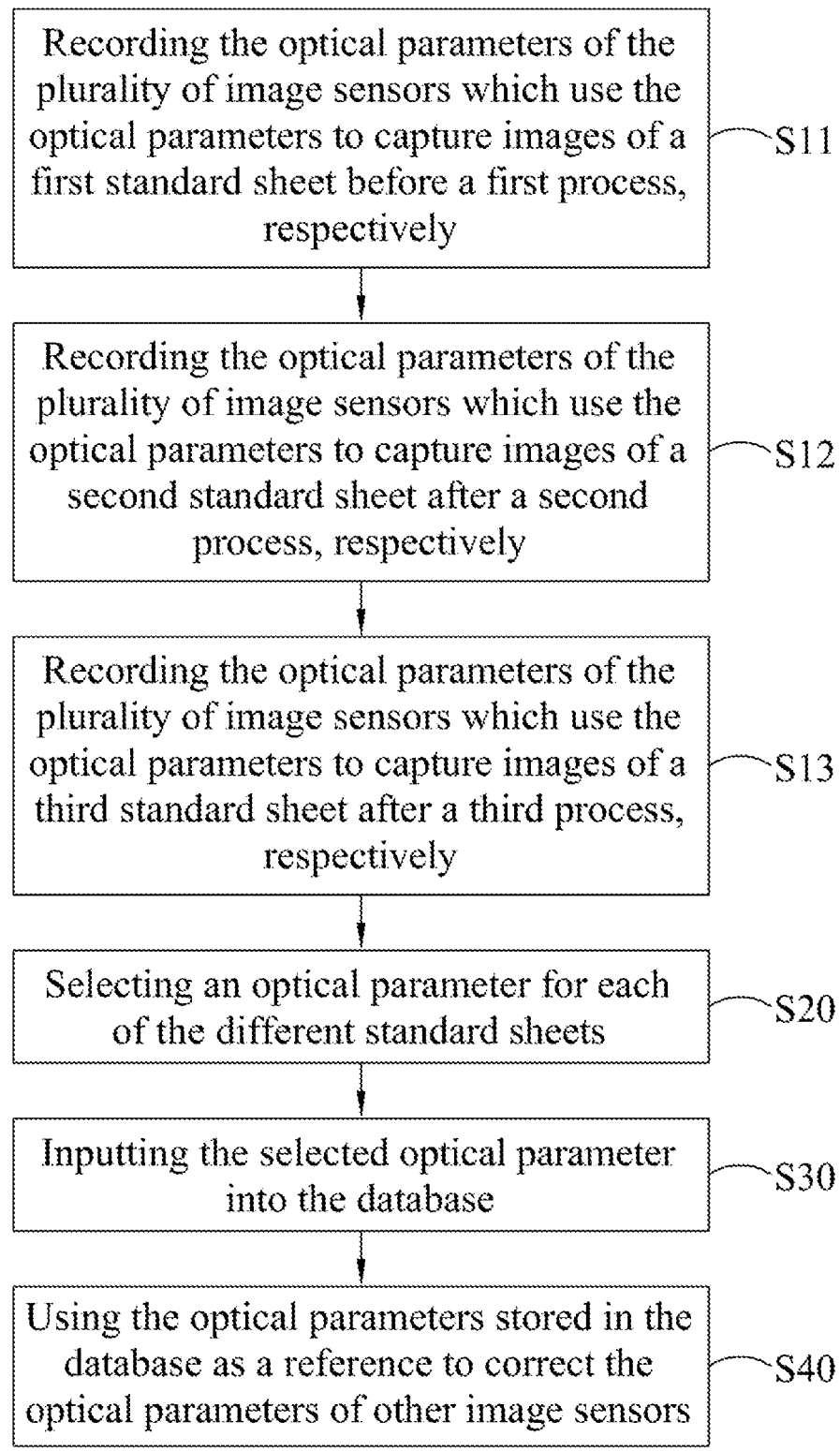
FIG. 2 is a flow chart of other embodiment of the chromatic aberration adjusting method of the present disclosure.

For example, the chromatic aberration adjusting method of the embodiment of the present disclosure can be applied to a color film camera, to eliminate chromatic aberration between the image captured by the color film camera and the actual measure sheet. Each color film camera includes two color image sensors; optionally, the image sensors of the present disclosure can include 8 image sensors. Please refer to FIG. 2. In an alternative embodiment, the step S10 further includes steps S11, S12 and S13. The step S11 is a step of recording optical parameters of the plurality of image sensors, wherein the plurality of image sensors are configured to capture images of a first standard sheet before a first process, respectively by using the optical parameter; the step S12 is a step of recording optical parameters of the plurality of image sensors, wherein the plurality of image sensors are configured to capture images of a second standard sheet after a second process, respectively by using the optical parameter; the step S13 is a step of recording optical parameters of the plurality of image sensors, wherein the plurality of image sensors are configured to capture images of a third standard sheet after a third process, respectively by using the optical parameter.

In an embodiment, the chromatic aberration adjusting method can be applied to, but not limited to, the apparatus of the detection device for LCD display device. In some embodiments, the chromatic aberration adjusting method can be also applied to the apparatus of the detection device for other display device, such as, OLED display device, Q LED display device, curved display device or the like.

Preferably, the first process can be red color resist process (abbreviated as R process), the second process is blue color resist process (abbreviated as B process), and the third process is a photo spacer process (abbreviated as PS process). The first standard sheet is a plain glass standard sheet, the second standard sheet is the standard sheet after the B process is performed thereon, and the third standard sheet is the standard sheet after the PS process is performed thereon. After a black matrix process is performed on the plain glass standard sheet, the R, G and B color processes are performed on the processed standard sheet to obtain the standard sheet after the B process, so as to make the standard sheet have chroma. After the B process, the ITO sputtering process is performed on the processed standard sheet, so as to form electrodes on the standard sheet; next, the PS process is performed on the processed standard sheet, to obtain the standard sheet after the PS process. When the plurality of image sensors are used to photograph the plurality of different standard sheets respectively, positions of the standard sheet, the camera lens and light source must be fixed, and strength of the light source must be the same, thereby reducing difference.

The step S20: selecting an optical parameter for each of the different standard sheets.

For each standard sheet, the manner of selecting one of the optical parameters can be determined according to actual requirement, In this embodiment, the visual colorimetry can be used to select the optical parameters corresponding to the image sensor, which captures the image having minimal difference from the color of the actual measure sheet; or, the color meter can be also used to select the optical parameters corresponding to the image sensor, which captures the image having minimal difference from the color of the actual measure sheet. Particularly, when the visual colorimetry is used, the standard sheet and the image captured by the image sensor are arranged alongside, and their adjacent sides are in contact with or overlapped with each other, and a distance between the user's eyes to the standard sheet is around 500 millimeters. In order to improve precision of the visual colorimetry, the position of the standard sheet should be changed frequently. When the color meter is used to select the optical parameters, the selection is determined according to the value measured by the color meter, that is, the optical parameter corresponding to the image sensor which captures the image having color values closest to the measure sheet is selected.

The step S30: inputting the selected optical parameter into the database.

In this embodiment, the optical parameter corresponding to the photograph of the plain glass standard sheet is marked as GLASS_01, the optical parameter corresponding to photograph of the standard sheet after the B process is marked as RGB_01, and the optical parameter corresponding to the photograph of the standard sheet after the PS process is marked as PS_01, and these optical parameters are inputted into the database.

The step S40: using the optical parameters stored in the database as a reference to correct the optical parameters of other image sensors.

Particularly, in the embodiment of the present disclosure, the optical parameters stored in the database can be used as reference optical signals of the other image sensors, and other image sensors are corrected according to the reference optical signal, thereby reducing chromatic aberration of the image sensors.

In the present disclosure, the chromatic aberration adjusting method includes steps of recording the optical parameters corresponding to the plurality of image sensors which using the optical parameters to capture the images of the plurality of different standard sheets; selecting an optical parameter for each of the different standard sheets; inputting the selected optical parameter into the database; and using the optical parameters stored in the database as the reference to correct the optical parameters of other image sensors. As a result, the database including the optical parameters corresponding to photograph of different standard sheets can be used to correct the optical parameters of other image sensors; by using the different optical parameters to capture image for different processes, the optical characteristic of the standard sheet can be close to that of the measure sheet in actual photograph, thereby achieving the purpose of eliminating chromatic aberration between different image sensors.

Figure 11:
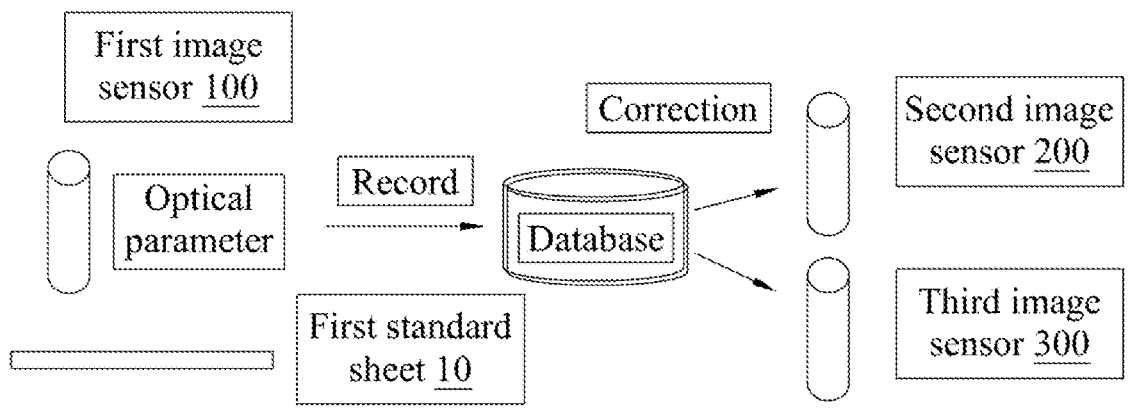
FIG. 11 is a schematic view of an operation of the chromatic aberration adjustment for a first standard sheet, in accordance with an embodiment of the present disclosure.
Figure 12:
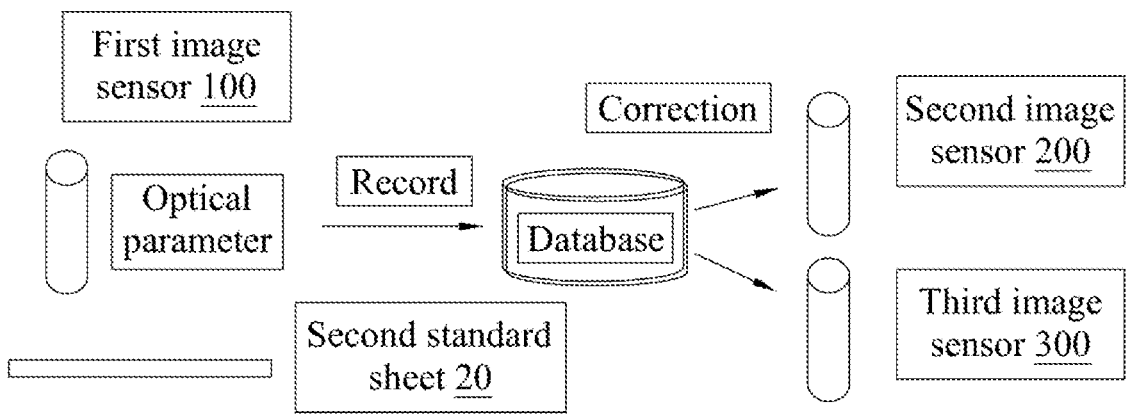
FIG. 12 is a schematic view of an operation of the chromatic aberration adjustment for a second standard sheet, in accordance with an embodiment of the present disclosure.
Figure 13:
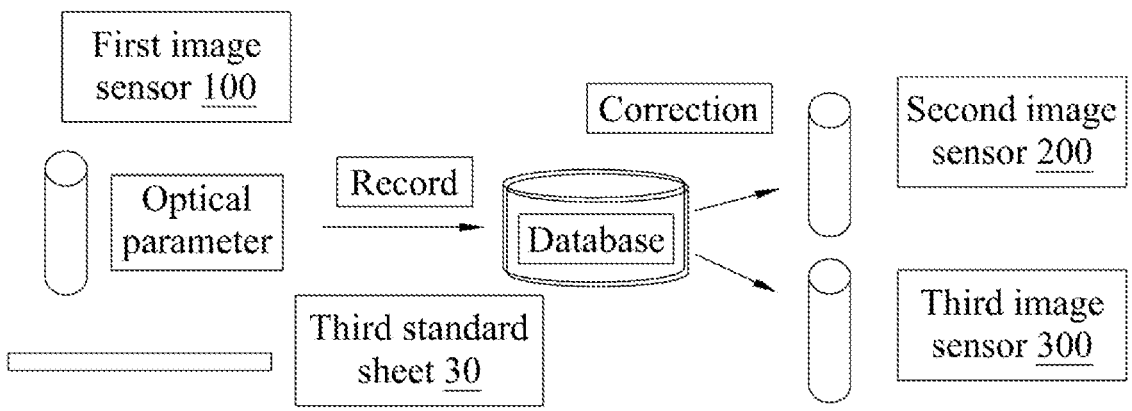
FIG. 13 is a schematic view of an operation of the chromatic aberration adjustment for a third standard sheet, in accordance with an embodiment of the present disclosure.

FIGS. 11 through 13 are schematic views of operations of chromatic aberration adjustment for a first standard sheet 10, a second standard sheet 20 and a third standard sheet 30, in accordance with the present disclosure, respectively. Please refer to FIG. 11. The optical parameters corresponding to the first image sensor 100 which uses the optical parameters to capture the image of the first standard sheet 10 are recorded, and the optical parameters are inputted into the database, the optical parameters of the second image sensor 200 and the third image sensor 300 are corrected based on the optical parameters stored in the database, so as to achieve the purpose of eliminating chromatic aberration between different image sensors. The principles of operations of the chromatic aberration adjustment shown in FIGS. 12 and 13 are the same as that of FIG. 11, so detailed descriptions are not repeated.

Figure 3:
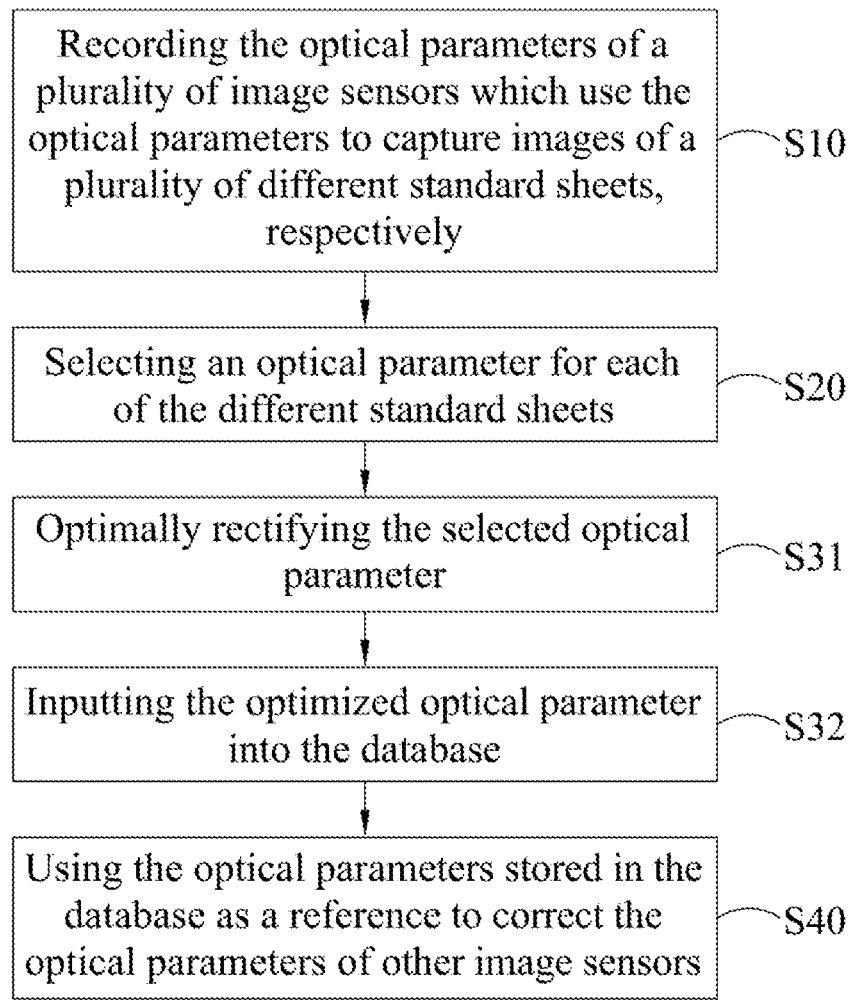
FIG. 3 is a flow chart of alternative embodiment of the chromatic aberration adjusting method of the present disclosure.

Please refer to FIG. 3. In alternative embodiment of the chromatic aberration adjusting method of the present disclosure, the step S30 includes steps S31 and S32.

The step S31 is a step of optimally rectifying the selected optical parameter.

The step S32 is a step of inputting the optimized optical parameter into the database.

In this embodiment, after the optical parameters corresponding to the image sensor, which captures the image having minimal difference from the actual measure sheet, are selected by the visual colorimetry or the color meter, the selected optical parameter are rectified optimally, so as to optimize the photograph effect of the selected image sensor. Particularly, the rectified optical parameters corresponding to the photograph of the plain glass standard sheet are marked as recipe GLASS_01, the rectified optical parameters corresponding to the photograph of the standard sheet after the B process are marked as recipe_RGB_01, the rectified optical parameters corresponding to the photograph of the standard sheet after the PS process are marked as recipe_PS_01, the rectified optical parameters are inputted into the database. In this embodiment, rectification performed on the selected optical parameter can effectively reduce the chromatic aberration.

Figure 4:
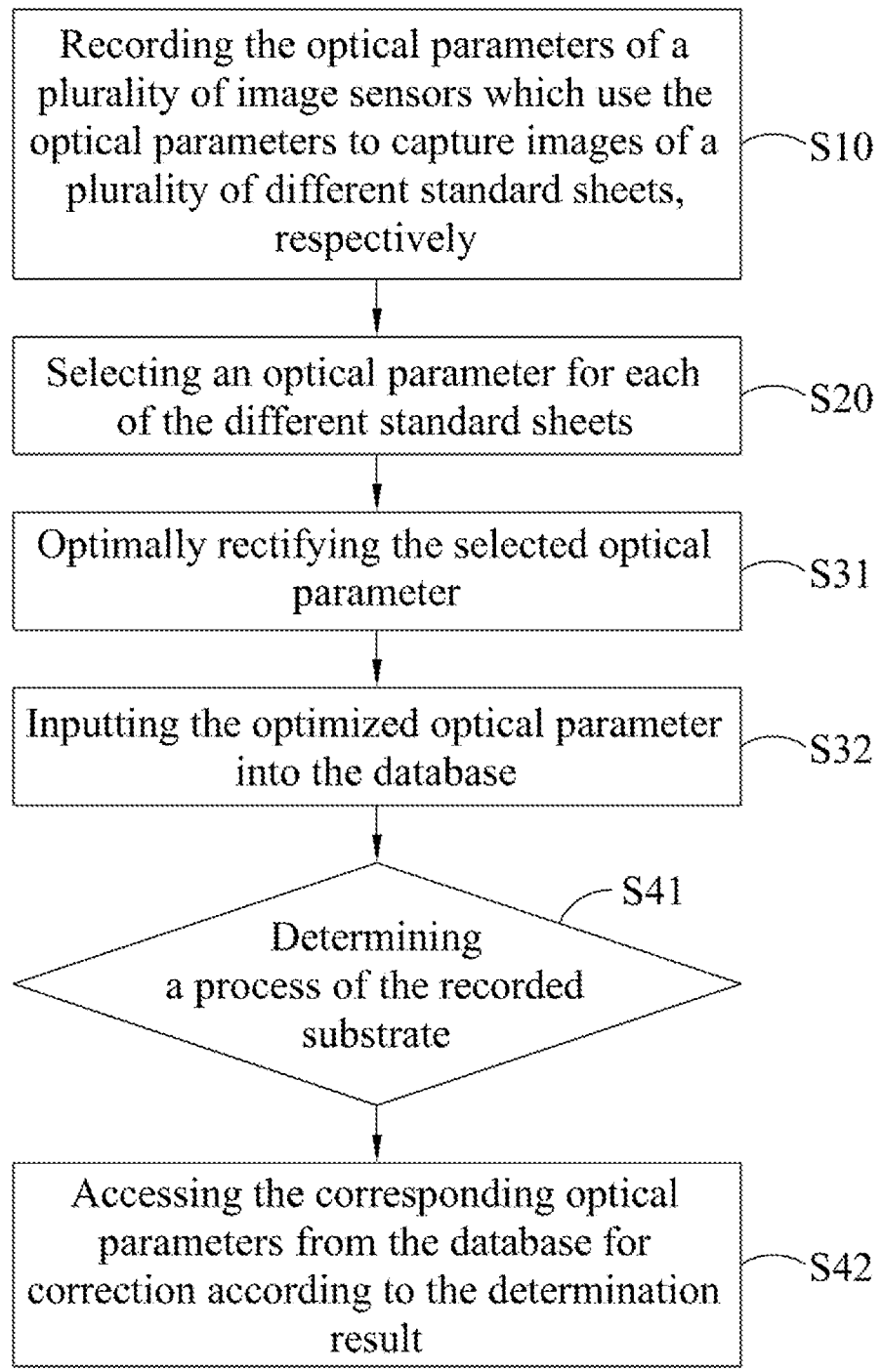
FIG. 4 is a flow chart of an alternative embodiment of the chromatic aberration adjusting method of the present disclosure.

Please refer to FIG. 4. In alternative embodiment of the chromatic aberration adjusting method of the present disclosure, the step S40 includes steps S41 and S42.

The step S41 is a step of determining a process of the recorded substrate.

The step S42 is a step of accessing the corresponding optical parameters from the database for adjustment according to the determination result of the step S41.

Figure 5:
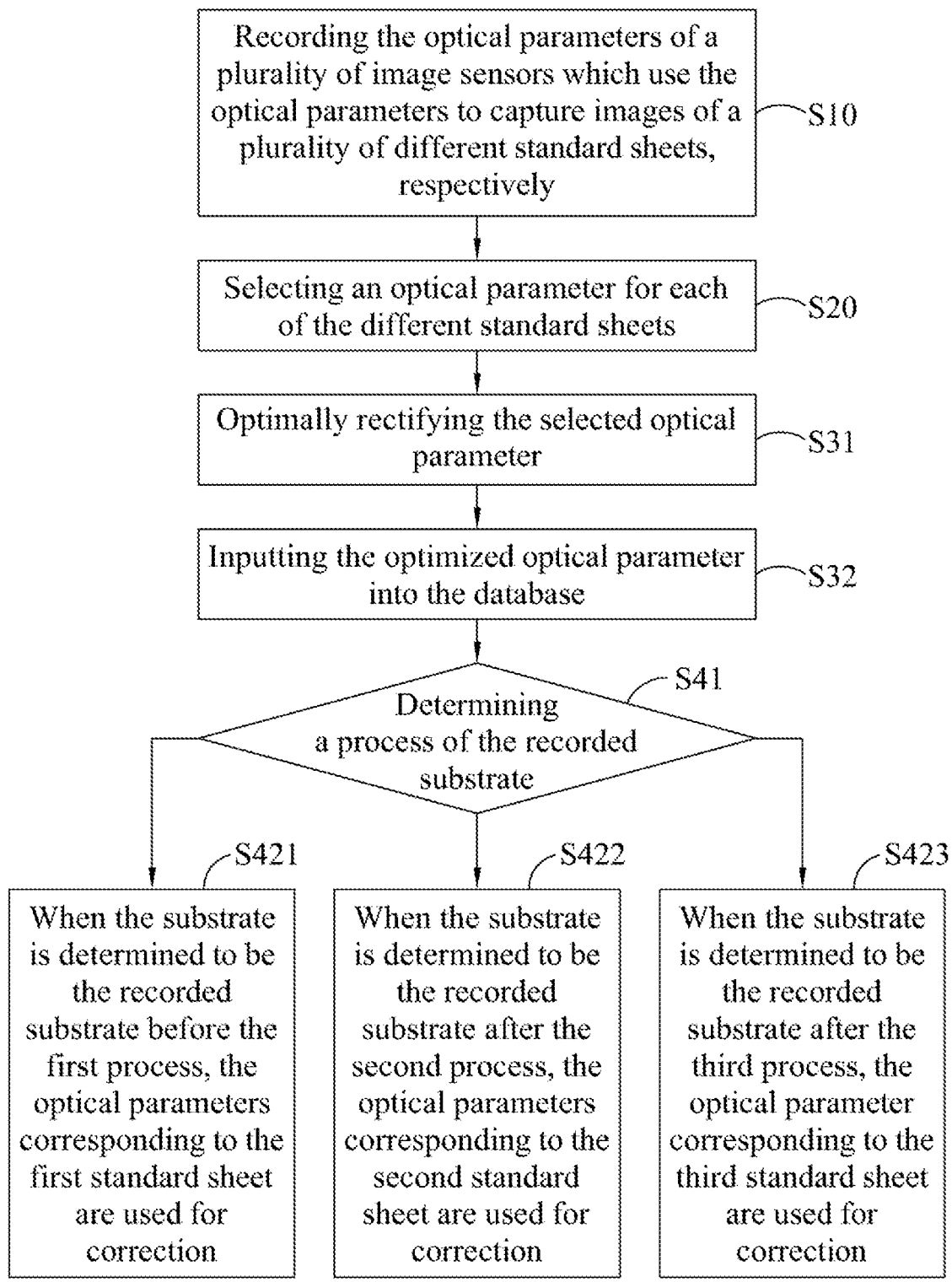
FIG. 5 is a flow chart of an alternative embodiment of the chromatic aberration adjusting method of the present disclosure.

In this embodiment, the substrates to be photographed may be for different processes, so it is to, according to properties of the substrates after different processes, determine which process the substrate belongs to. Particularly, when the substrate has a standard glass pattern, that the substrate is determined to be the substrate before the R color resist process; when the substrate has chroma, the substrate is determined to be the substrate after the B process; when the substrate has electrical conductivity, the substrate is determined to be the substrate after the PS process. In this embodiment of the present disclosure, multiple determination manners are used to determine which process the substrate belongs to, so as to adapt the actual process requirement of the substrate. According to the determination result, the corresponding optical parameters stored in the database can be used for further adjustment. Please refer to FIG. 5. In another embodiment, the step S42 includes steps S421, S422 and S423. In the step S421, when the substrate is determined to be the recorded substrate before the first process, the optical parameters corresponding to the first standard sheet are used for adjustment; in the step S422, when the substrate is determined to be the recorded substrate after the second process, the optical parameters corresponding to the second standard sheet are used for adjustment; in the step S423, when the substrate is determined to be the recorded substrate after the third process, the optical parameter corresponding to the third standard sheet are used for adjustment.

Figure 6:
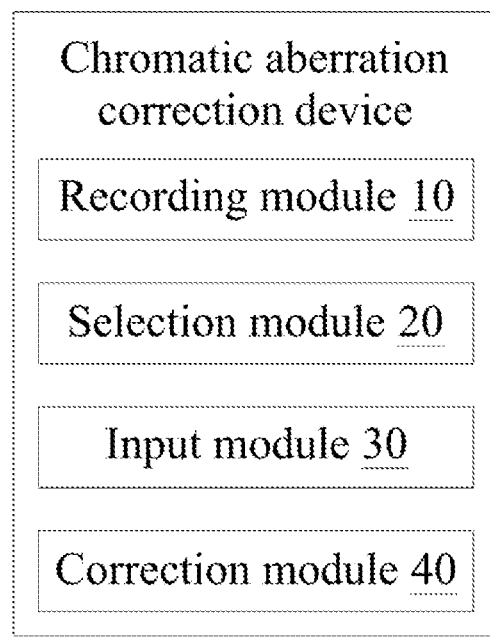
FIG. 6 is a schematic view of function modules of an embodiment of a apparatus of detection device of the present disclosure.

Please refer to FIG. 6. The present disclosure further provides a apparatus of the detection device. In an embodiment, the apparatus of the detection device includes a recording module 10, a selection module 20, an input module 30, and a adjusting module 40.

The recording module 10 is configured to record the optical parameters of the plurality of image sensors wherein the plurality of image sensors are configured to capture images of a plurality of different standard sheets respectively by using the optical parameters.

Figure 7:
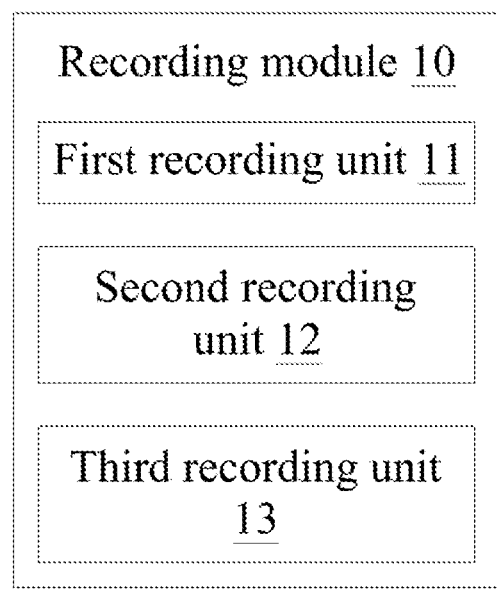
FIG. 7 is a schematic view of detailed function modules included in a recording module of an embodiment of the apparatus of detection device of the present disclosure.

For example, the chromatic aberration adjusting method of the embodiment of the present disclosure can be applied to the color film camera, to eliminate chromatic aberration between image captured by the color film camera and the actual measure sheet. Each color film camera includes two color image sensors. Optionally, the image sensors of the present disclosure can include 8 image sensors. Please refer to FIG. 7. In some embodiments, the recording module 10 includes: a first recording unit 11 configured to record the optical parameters of the plurality of image sensors wherein the plurality of image sensors are configured to capture images of the first standard sheets before the first process respectively by using the optical parameters; a second recording unit 12 configured to record the optical parameters of the plurality of image sensors wherein the plurality of image sensors are configured to capture images of the second standard sheets after the second process respectively by using the optical parameters; a third recording unit 13 configured to record the optical parameters of the plurality of image sensors wherein the plurality of image sensors are configured to capture images of the third standard sheets after the third process respectively by using the optical parameters.

In an embodiment, the chromatic aberration adjusting method can be applied to the apparatus of the detection device for the LCD display device, but the present disclosure is not limited thereto. In some embodiments, the chromatic aberration adjusting method can be also applied to the apparatus of the detection device for other display device. For example, OLED display device, Q LED display device, curved display device or the like.

Preferably, the first process can be the R process, the second process is the B process, and the third process is the PS process. The first standard sheet is the plain glass standard sheet, the second standard sheet is the standard sheet after the B process, and the third standard sheet is the standard sheet after the PS process. After the black matrix process is performed on the plain glass standard sheet, the R, G, B color processes are performed on the processed standard sheet, to obtain the standard sheet after the B process, so as to make the standard sheet have chroma. After the B process, the ITO sputtering process is performed on the processed the standard sheet, so as to form electrodes on the standard sheet. Next, the PS process is performed on the processed standard sheet, to obtain the standard sheet after the PS process. When the plurality of image sensors are used to photograph the plurality of different standard sheets respectively, positions of the standard sheet, the camera lens and light source must be fixed, and strength of the light source must be the same, thereby reducing difference.

The selection module 20 is configured to select an optical parameter for each of the different standard sheet.

For each standard sheet, the process of selecting the optical parameter can be executed according to actual requirement, In this embodiment, the visual colorimetry can be used to select the optical parameter corresponding to the image sensor, which captures the image having minimal difference from the color of the actual measure sheet; or, the color meter can be also used to select the optical parameter corresponding to the image sensor, which captures the image having minimal difference from the color of the actual measure sheet. Particularly, when the visual colorimetry is used, the standard sheet and the image captured by the image sensor are arranged alongside, and their adjacent sides are in contact with or overlapped with each other, and the distance between the user's eyes to the standard sheet is around 500 millimeters. In order to improve precision of the visual colorimetry, the position of the standard sheet should be changed frequently. When the color meter is used to select the optical parameter, the selection is determined according to the value measured by the color meter, that is, the optical parameter corresponding to the image sensor which captures the image having color values closest to the measure sheet.

The input module 30 is configured to input the selected optical parameter set into the database.

In this embodiment, the optical parameter set corresponding to the photograph of the plain glass standard sheet is marked as GLASS_01, the optical parameter set corresponding to the photograph of the standard sheet after the B process is marked as RGB_01, and the optical parameter set corresponding to the photograph of the sheet after the PS process is marked as PS_01. Next, the optical parameter sets are inputted into the database.

The adjusting module 40 is configured to use the optical parameters stored in the database as the reference to correct the optical parameters of the other image sensors.

In the embodiment of the present disclosure, the optical parameters stored in the database can be used as adjusting parameters of the reference optical signals of the other image sensors, and different parameter sets are used for different glasses of different processes, so that the chromatic aberration occurred in the photograph of the image sensor can be reduced.

In the present disclosure, the chromatic aberration correct device is to record the optical parameters corresponding to the plurality of image sensors which use the optical parameters to capture the images of the plurality of different standard sheets, and then select an optical parameter for each of the different standard sheets and then input the selected optical parameters into the database; and then correct the optical parameters of the other image sensors according to the database. The database storing optical parameters corresponding to different standard sheets can be used to correct the optical parameters of the image sensors, and the different optical parameters are used to capture image for different processes, so that the optical characteristic of the standard sheet can be close to that of the measure sheet in actual photograph, thereby achieving the purpose of eliminating chromatic aberration between different the image sensors.

FIGS. 11 through 13 are schematic view of operations of chromatic aberration adjustment for the first standard sheet 10, the second standard sheet 20 and the third standard sheet 30, in accordance with the present disclosure, respectively. Please refer to FIG. 11, the optical parameter corresponding to the first image sensor 100 which uses the optical parameter to capture an image of the first standard sheet 10 is recorded and inputted into the database, the optical parameters of the second the image sensor 200 and the third the image sensor 300 are corrected based on the optical parameters stored in the database, so as to achieve the purpose of eliminating chromatic aberration between different the image sensors. The principle of operation of the chromatic aberration adjustment shown in FIGS. 12 and 13 are the same as that of FIG. 11, so detailed descriptions are not repeated.

Figure 8:
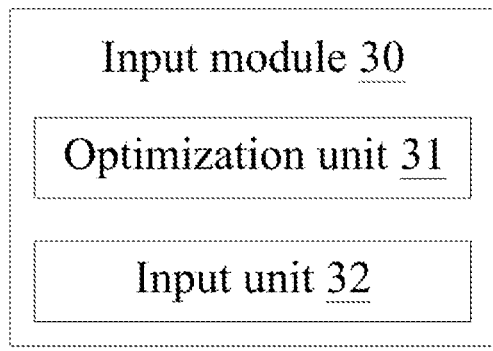
FIG. 8 is a schematic view of detailed function modules of the input module of alternative embodiment of the apparatus of detection device of the present disclosure.

Please refer to FIG. 8. In alternative embodiment of the apparatus of the detection device of the present disclosure, the input module 30 includes an optimization unit 31 and an input unit 32.

The optimization unit 31 is configured to optimally rectify the selected optical parameter.

The input unit 32 is configured to input the optimized optical parameter into the database.

In this embodiment, after the optical parameter corresponding to the image sensor, which captures the image having minimal difference from the actual measure sheet, is selected by the visual colorimetry or the color meter, the selected optical parameter, is rectified optimally to optimize the photograph effect of the selected the image sensor. Particularly, the rectified the optical parameter corresponding to the photograph of the plain glass standard sheet is marked as recipe GLASS_01, the rectified the optical parameter corresponding to the photograph of the standard sheet after the B process is marked as recipe_RGB_01, and the rectified the optical parameters corresponding to the photograph of the standard sheet after the PS process is marked as recipe_PS_01. The rectified optical parameters are inputted into the database. In this embodiment, the rectification performed on the selected optical parameter can reduce the chromatic aberration.

Figure 9:
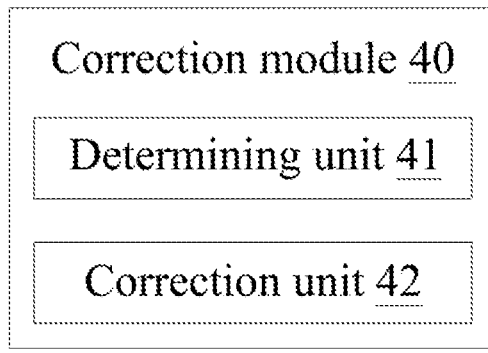
FIG. 9 is a schematic view of detailed function modules of a adjusting module of alternative embodiment of the apparatus of detection device of the present disclosure.

Please refer to FIG. 9. In alternative embodiment of the apparatus of the detection device of the present disclosure, the adjusting module may include a determining unit 41 and an adjusting unit 42.

The determining unit 41 is configured to determine the process of the recorded substrate.

The adjusting unit 42 is configured to, according to the determination result, access the corresponding the optical parameter from the database for adjustment.

Figure 10:
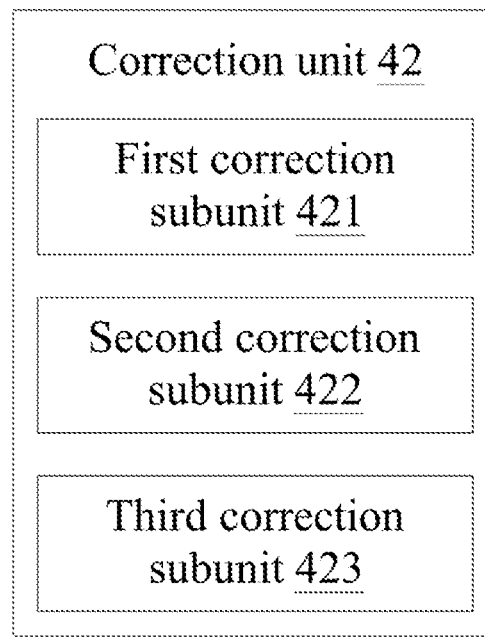
FIG. 10 is a schematic view of detailed function module of the adjusting unit of alternative embodiment of the apparatus of detection device of the present disclosure.

In this embodiment, the substrates to be photographed may be for different processes; according to properties of the substrates before or after different processes, the determining unit 41 determines which process the substrate belongs to. Particularly, when the substrate has a standard glass pattern, the determining unit 41 determines that the substrate is the substrate before the R color resist process; when the substrate has chroma, the determining unit 41 determines that the substrate is the substrate after the B process; and when the substrate has electrical conductivity, the determining unit 41 determines that the substrate is the substrate after the PS process. In the present disclosure, multiple determination manners can be used to determine which process the substrate belongs to, so as to adapt the actual process requirement of the substrate. According to the determination result, the corresponding the optical parameters stored in the database are used for further adjustment. Particularly, in another embodiment, Please refer to FIG. 10. The adjusting unit 42 may include a first adjusting subunit 421, a second adjusting subunit 422 and a third adjusting subunit 423. The first adjusting subunit 421 is configured to access the optical parameter corresponding to the first standard sheet for adjustment when the substrate is determined to be the recorded substrate before the first process; the second adjusting subunit 422 is configured to access the optical parameter corresponding to the second standard sheet for adjustment when the substrate is determined to be the recorded substrate after the second process; and the third adjusting subunit 423 is configured to access the optical parameter corresponding to the third standard sheet for adjustment when the substrate is determined to be the recorded substrate after the third process.

According to above-mentioned content, the chromatic aberration correct device and method are to record the optical parameters corresponding to the plurality of image sensors which use the optical parameters to capture the images of the plurality of different standard sheets, and then select an optical parameter for each of the different standard sheets and then input the selected optical parameters into the database; and then use the optical parameters stored in the database correct as the reference to correct the optical parameters of the other image sensors. The database storing optical parameters corresponding to different standard sheets can be used to correct the optical parameters of the image sensors, and the image sensors can use different optical parameters to capture images for different processes, so that the optical characteristic of the standard sheet can be close to that of the measure sheet in actual photograph, thereby achieving the purpose of eliminating chromatic aberration between different the image sensors The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A chromatic aberration adjusting method, comprising:
    recording optical parameters of a plurality of image sensors, wherein the plurality of image sensors are configured to capture images of a plurality of different standard sheets respectively by using the optical parameters;
    selecting an optical parameter for each of the different standard sheet;
    inputting the selected optical parameters into a database; and
    using the optical parameters stored in the database as a reference, to correct the optical parameters of other image sensors.

2. The chromatic aberration adjusting method according to claim 1, wherein the step of recording the optical parameters of the plurality of image sensors further comprises:
    recording the optical parameters of the plurality of image sensors, wherein the plurality of image sensors are configured to capture the images of a first standard sheet before a first process, respectively by using the optical parameters;
    recording the optical parameters of the plurality of image sensors, wherein the plurality of image sensors are configured to capture the images of a second standard sheet after a second process, respectively by using the optical parameters; and
    recording the optical parameters of the plurality of image sensors, wherein the plurality of image sensors are configured to capture the images of a third standard sheet after a third process, respectively by using the optical parameters.

3. The chromatic aberration adjusting method according to claim 2, wherein the first process is a red color resist process, the second process is a blue color resist process, and the third process is a photo spacer process.

4. The chromatic aberration adjusting method according to claim 2, wherein the step of using the optical parameters stored in the database as the reference to correct the optical parameters of other image sensors, further comprises:
    determining a process of the recorded substrate; and
    according to a determination result, accessing the corresponding optical parameters from the database for adjustment.

5. The chromatic aberration adjusting method according to claim 4, wherein the step of accessing the corresponding optical parameters from the database for adjustment according to the determination result, further comprises:
    when the recorded substrate is determined to be the substrate before the first process, accessing the optical parameter corresponding to the first standard sheet for adjustment;

when the recorded substrate is determined to be the substrate after the second process, accessing the optical parameter corresponding to the second standard sheet for adjustment; and when the recorded substrate is determined to be the substrate after the third process, accessing the optical parameter corresponding to the third standard sheet for adjustment.

6. The chromatic aberration adjusting method according to claim 5, wherein the step of determining the process of the recorded substrate, further comprises:

when the substrate has a standard glass pattern, determining the substrate to be the substrate before the first process;

when the substrate has chroma, determining the substrate to be the substrate after the second process; and when the substrate has electrical conductivity, determining the substrate to be the substrate after the third process.

7. The chromatic aberration adjusting method according to claim 1, wherein the step of inputting the selected optical parameter into the database, further comprises:

optimally rectifying the selected optical parameter; and
inputting the rectified optical parameter into the database.

8. An apparatus of a detection device, comprising:

a recording module configured to record the optical parameters of a plurality of image sensors, wherein the plurality of image sensors are configured to capture images of a plurality of different standard sheets respectively by using the optical parameters;

a selection module configured to select an optical parameter for each of the different standard sheets;

an input module configured to input the selected optical parameter into a database; and a adjusting module configured to use the optical parameters stored in the database as a reference to correct the optical parameters of other image sensors.

9. The apparatus of the detection device according to claim 8, wherein the recording module comprises:

a first recording unit configured to record the optical parameters of the plurality of image sensors, wherein the plurality of image sensors are configured to capture images of a first standard sheet before a first process respectively by using the optical parameters;

a second recording unit configured to record the optical parameters of the plurality of image sensors, wherein the plurality of image sensors are configured to capture images of a second standard sheet after a second process respectively by using the optical parameters; and a third recording unit configured to record the optical parameters of the plurality of image sensors, wherein the plurality of image sensors are configured to capture images of a third standard sheet after a third process respectively by using the optical parameters.

10. The apparatus of the detection device according to claim 9, wherein the first process is a red color resist process, the second process is a blue color resist process, and the third process is a photo spacer process.

11. The apparatus of the detection device according to claim 9, wherein the adjusting module further comprises:

a determining unit configured to determine a process of the recorded substrate; and an adjusting unit configured to, according to a determination result, access the corresponding the optical parameter from the database for adjustment.

12. The apparatus of the detection device according to claim 11, wherein the adjusting unit comprises:

a first adjusting subunit configured to access the optical parameters corresponding to the first standard sheet for adjustment when the recorded substrate is determined to be the substrate before the first process;

a second adjusting subunit configured to access the optical parameters corresponding to the second standard sheet for adjustment when the recorded substrate is determined to be the substrate after the second process; and a third adjusting subunit configured to access the optical parameter corresponding to the third standard sheet for adjustment when the recorded substrate is determined to be the substrate after the third process.

13. The apparatus of the detection device according to claim 12, wherein the determining unit determines that the substrate having standard glass pattern is the substrate before the first process, determines that the substrate having chroma is the substrate after the second process, and determines that the substrate having electrical conductivity is the substrate after the third process.

14. The apparatus of the detection device according to claim 8, wherein the input module comprises:

an optimization unit configured to optimally rectify the selected optical parameter; and an input unit configured to input the optimized optical parameter into the database.

15. An apparatus of the detection device, comprising:

a recording module comprising a first recording unit, a second recording unit and a third recording unit, and the first recording unit configured to record optical parameters of a plurality of image sensors wherein the plurality of image sensors are configured to capture images of the first standard sheet before the first process respectively by using the optical parameters, the second recording unit configured to record optical parameters of the plurality of image sensors wherein the plurality of image sensors are configured to capture images of a second standard sheet after the second process by using the optical parameters, and the third recording unit configured to record optical parameters of the plurality of image sensors wherein the plurality of image sensors are configured to capture images of a third standard sheet after the third process by using the optical parameters;

a selection module configured to select an optical parameter for each of the first, second and third standard sheets;

an input module comprising an optimization unit and an input unit, and the optimization unit configured to optimally rectify the selected optical parameters, and the input unit configured to input the optimized optical parameter into the database, and a adjusting module configured to use the optical parameters stored in the database as a reference, to correct the optical parameters of other image sensors.

16. The apparatus of the detection device according to claim 15, wherein the first process is a red color resist process, the second process is a blue color resist process, and the third process is a photo spacer process.

17. The apparatus of the detection device according to claim 15, wherein the correction module comprises:

a determining unit configured to determine a process of the recorded substrate; and a adjusting unit configured to access, according to a determination result, the corresponding the optical parameter from the database for adjustment.

18. The apparatus of the detection according to claim 15, wherein the correction unit comprises:
- a first adjusting subunit configured to access the optical parameters corresponding to the first standard sheet for adjustment when the recorded substrate is determined to be the substrate before the first process;
- a second adjusting subunit configured to access the optical parameters corresponding to the second standard sheet for adjustment when the recorded substrate is determined to be the substrate after the second process; and
- a third adjusting subunit configured to access the optical parameters corresponding to the third standard sheet for adjustment when the recorded substrate is determined to be the substrate after the third process.

19. The apparatus of the detection device according to claim 18, wherein the determining unit determines that the substrate having standard glass pattern is the substrate before the first process, determines that the substrate having chroma is the substrate after the second process, and determines that the substrate having electrical conductivity is the substrate after the third process.

\* \* \* \* \*